UNITED STATES PATENT OFFICE.

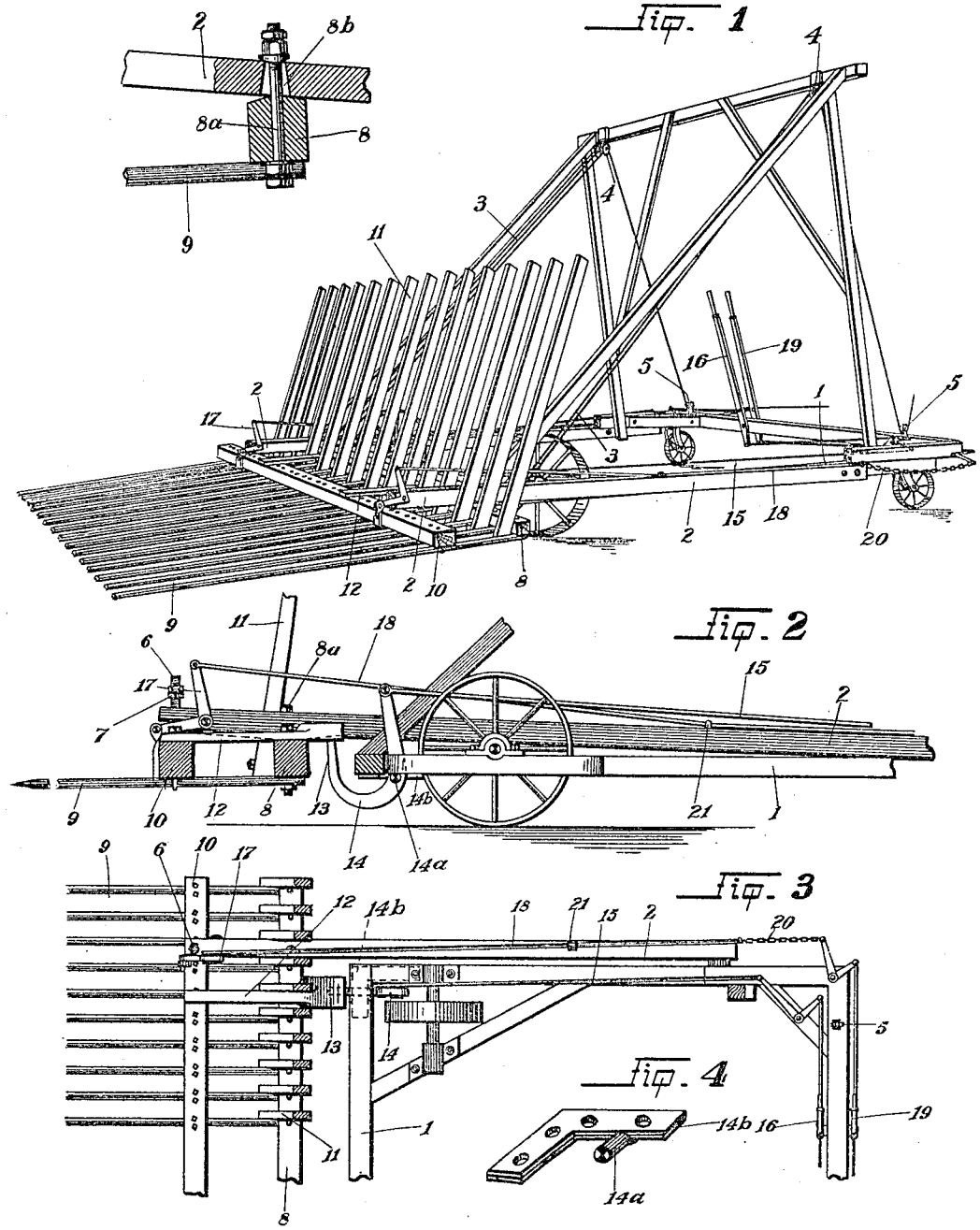

ALBERT H. BOSWORTH, OF FALL RIVER MILLS, CALIFORNIA.

HAY-PITCHER.

943,963.  Specification of Letters Patent.  Patented Dec. 21, 1909.

Application filed May 11, 1908, Serial No. 432,301. Renewed July 12, 1909. Serial No. 507,263.

*To all whom it may concern:*

Be it known that I, ALBERT H. BOSWORTH, a citizen of the United States, residing at Fall River Mills, in the county of Shasta and State of California, have invented certain new and useful Improvements in Hay-Pitchers; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in farming implements and particularly to hay pitchers or loaders used for loading hay, straw, etc. from the fields onto the hay rack or other wagon, the object of the invention being to produce a means for loading the hay onto the wagons with a mechanical means thereby doing away with the necessity of relying on manual labor which is slow, expensive and unreliable as a general rule. Also to produce a simple, inexpensive and effective implement for the purpose and having an accurate adjustment of all parts thereby insuring satisfactory and efficient operation. This object I accomplish by means of a main frame having pivoted arms adapted to be raised and lowered, on the outer end of which arms is secured a hay buck having a back rack whereby when the arms are raised, the hay will be held in said rack for delivery into a wagon; said buck having certain lever adjustments for raising or dipping the same when gathering the hay; also by such other and further construction and relative arrangement of parts as will appear by a perusal of the following specification and claim.

The main features of the device are set forth in a pending application for a patent, hence this application applies and refers to but certain features, viz:—the specific construction of the buck and the lever adjustment mechanism connected therewith.

In the drawings similar characters of reference indicate corresponding parts in the several views.

Figure 1 is a perspective view of the complete hay pitcher. Fig. 2 is a fragmentary view of a lever adjustment mechanism. Fig. 3 is a top plan view of a fragmentary portion of the device showing a lever adjustment mechanism. Fig. 4 is a perspective view of a bearing pin. Fig. 5 is a fragmentary view of a slotted bolt mechanism.

Referring more particularly to the characters of reference on the drawings 1 represents a wheel mounted frame on which are pivoted arms 2 adapted to be raised and lowered by means of cables 3 connected with the outer ends of the said arms 2 and running over pulleys 4 on the upper beams of the frame 1 and thence through pulleys 5 on the lower beams, to which cables may be connected horse or other suitable power for raising said arms 2. On the outer ends of said arms 2 are vertically slidably disposed pins 6 having stop nuts 7, on their upper ends, and on the lower ends are secured cross beams 10 on the bottom of which are secured buck teeth 9, there being a similar beam 8 secured across the top of said buck teeth and spaced a distance apart from and to the rear of said beam 10, the retaining bolts 8ª of the beam 8 being slidably disposed in slots 8ᵇ in the arms 2. Secured to the beam 8 are rack bars 11 for holding and retaining the hay picked up by the teeth 9.

To secure accurate and practical operation it is necessary that the teeth 9 be capable of being lowered or dipped close to the ground when picking up the hay and to be raised from the ground when the buck is full. The lowering I accomplish by means of bars 12 connecting across the tops of the beams 8 and 10 and having rearwardly projecting bearing plates or feet 13 on the under side of which bear the free arms of hook shaped bell cranks 14 pivoted to the frame 1, the other arms of said bell cranks being provided with rods 15 having lever connections 16 for operating the bell cranks 14 to bear against the members 13 thereby normally sustaining the arms 2 and the buck in any desired position and when it is desired to lower the buck to run under the hay the lever 16 is operated to lower the free ends of the bell cranks 14 thereby permitting the arms 2 and buck to lower, as desired.

When the buck is filled it is raised from the ground by means of bell cranks 17 pivoted to the outer ends of the arms 2 and having one set of their arms flexibly connected with the beam 10 and their other arms being provided with rods 18 connected with a lever 19 which can be operated to cause the bell cranks 17 to lift the teeth 9 upward as desired, the slidable pins 6 and bolts 8ª permitting of this as is apparent, whereby said buck may be lifted from the ground independently of any movement of the arms 2. Intermediate flexible connections 20 in the rods 18 permit the beams 2 to be raised without damage to said rods, said rods being also held close to said arms 2 by means of eyes 21. The bearings 14ª of the bell cranks 14 are formed on the joining angle plates 14ᵇ of the corners of the base beams of the frame 1.

From the foregoing description it will be readily seen that I have produced a device which substantially fulfils the objects of the invention.

While this specification sets forth in detail the present and preferred construction of my device still in practice such deviations from such detail may be resorted to as do not form a departure from the spirit of the invention.

Having thus described my invention what I claim as new and useful and desire to secure by Letters Patent is:—

The combination of a frame, pivoted arms thereon, a buck pivotally mounted on said arms, and means on said arms for moving said buck on its pivotal point.

In testimony whereof I affix my signature in presence of two witnesses.

ALBERT H. BOSWORTH.

Witnesses:
PERCY S. WEBSTER,
FRANK H. CARTER.